July 31, 1956  A. C. NOLTE  2,756,714
DEVICES FOR INDICATING THE POSITIONS OF THE SPEED
CHANGE LEVERS FOR A LATHE IN RESPONSE
TO SELECTION OF SPINDLE SPEEDS
Filed Jan. 20, 1955  4 Sheets-Sheet 2

INVENTOR.
ARTHUR C. NOLTE
BY
Zugelter & Zugelter
Attys.

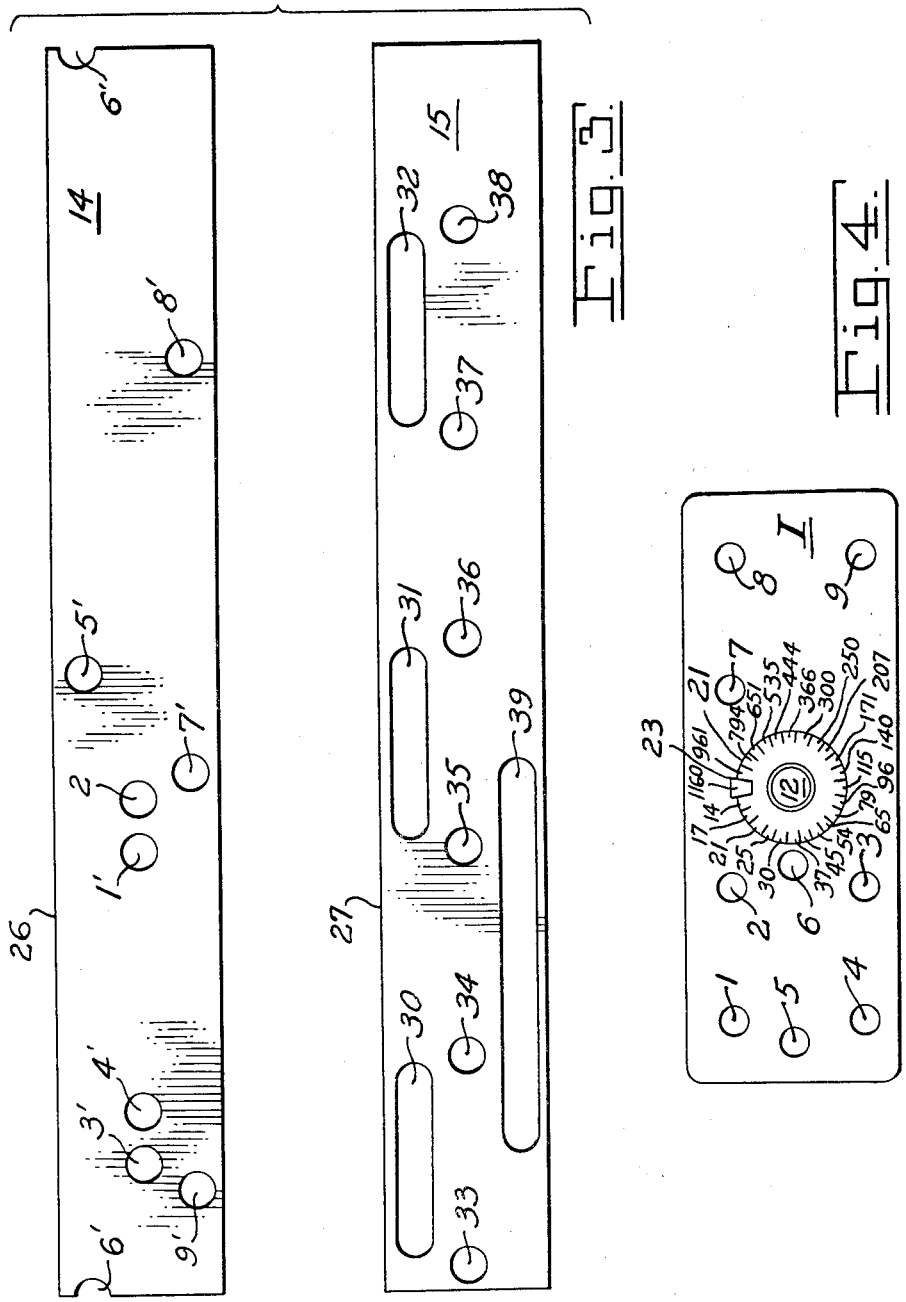

| DIAL SETTING SPEED IN R.P.M. | POSITION OF LEVERS A, B, & C AS INDICATED BY ILLUMINATED DIGITS | | | | | | | | |
|---|---|---|---|---|---|---|---|---|---|
| | A | | | | B | | C | | |
| | 1 | 2 | 3 | 4 | 5 | 6 | 7 | 8 | 9 |
| 14 | × | | | | × | | × | | |
| 17 | | × | | | × | | × | | |
| 21 | | | × | | × | | × | | |
| 25 | | | | × | × | | × | | |
| 30 | × | | | | | × | × | | |
| 37 | | × | | | | × | × | | |
| 45 | | | × | | | × | × | | |
| 54 | | | | × | | × | × | | |
| 65 | × | | | | × | | | × | |
| 79 | | × | | | × | | | × | |
| 96 | | | × | | × | | | × | |
| 115 | | | | × | × | | | × | |
| 140 | × | | | | | × | | × | |
| 171 | | × | | | | × | | × | |
| 207 | | | × | | | × | | × | |
| 250 | | | | × | | × | | × | |
| 300 | × | | | | × | | | | × |
| 366 | | × | | | × | | | | × |
| 444 | | | × | | × | | | | × |
| 535 | | | | × | × | | | | × |
| 651 | × | | | | | × | | | × |
| 794 | | × | | | | × | | | × |
| 961 | | | × | | | × | | | × |
| 1160 | | | | × | | × | | | × |

Fig. 5.

INVENTOR.
ARTHUR C. NOLTE

United States Patent Office 2,756,714
Patented July 31, 1956

2,756,714

DEVICES FOR INDICATING THE POSITIONS OF THE SPEED CHANGE LEVERS FOR A LATHE IN RESPONSE TO SELECTION OF SPINDLE SPEEDS

Arthur C. Nolte, Blue Ash, Ohio, assignor to The Lodge & Shipley Company, Cincinnati, Ohio, a corporation of Ohio Application January 20, 1955, Serial No. 483,116

5 Claims. (Cl. 116—115)

This invention relates to machine tools such as lathes and more particularly to a device for indicating by means of illuminated digits what the location of the speed change levers should be for a given selected speed of rotation of the spindle or the work piece.

The speed at which a work piece is to be rotated is determined by cutting speed, diameter of the work piece etc. Lathes are provided with speed change gear boxes and the gear changes are made by shifting levers to the required location. In the particular lathe under consideration in this application, there are three shift levers and each one must be in a predetermined position in order to obtain a selected R. P. M. of the spindle and the work piece.

Ordinarily, the operator of modern lathes looks to a chart which tells him the various lever positions for a particular spindle speed, but this may lead to error if the chart is not read correctly.

An object of this invention is to provide a device which is so constructed that when a dial is turned to the speed required, the lever positions for that speed are automatically illuminated and remain illuminated until a different speed has been selected.

Another object of the invention is to provide a dial upon which the speeds in R. P. M. are indicated for the various speed change combinations, and a light piping mechanism controlled by a drum shutter operated in unison with the dial, whereby for every speed graduation on the dial the proper combination of lever positions are illuminated by piped light.

A further object of the invention is to provide a device as set forth in the next preceding object that requires but a single light source for illuminating the gear shift lever positions.

The above and other objects of the invention will be apparent to those of ordinary skill in the art to which the invention pertains, from the following description and drawings.

In the drawings:

Figure 1 is a view in front elevation of a control panel for a lathe, which is provided with a device embodying the invention, for automatically indicating the positions of the control levers when a given R. P. M. selection for the spindle has been made;

Fig. 3 is a view illustrating a development of the shutter and a cylinder embodied in the indicator;

Fig. 4 is a more or less diagrammatic view of the arrangement of the indicator and the location of the lever positions which are selectively illuminated when the selector dial is turned to the various speed indicating positions; and Fig. 5 is a chart showing which of the lever positions are illuminated for twenty-four speed settings of the spindle.

Figure 1:
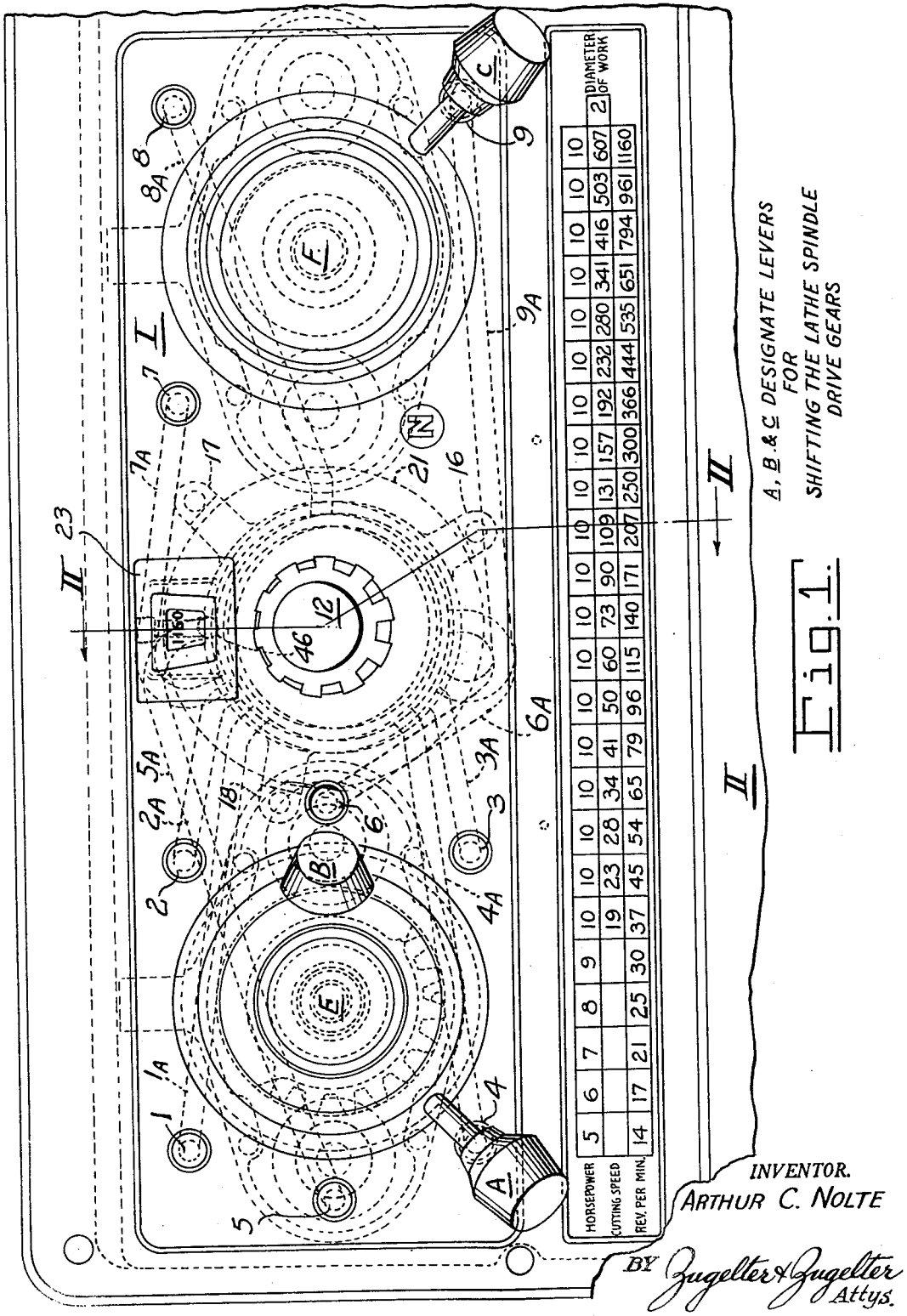

In Fig. 1 of the drawings a control panel I is shown mounted on the frame II of a lathe (not shown).

The panel I is provided with speed change levers A and B that are arranged to be rotated about a common center E and a lever C which is rotatable about a center F.

The particular mechanism operated by levers A, B and C for effecting the various speed changes, forms no part of this invention as these mechanisms are well known in the art. The invention of this application pertains to a simple and positive mechanism for indicating what the lever positions should be for a given spindle speed.

The panel I is provided with a group of windows or lenses which are preferably located to be concentric with the center E. These windows or lenses are designated by reference characters 1, 2, 3, 4, 5 and 6 and correspond to various of the positions to which levers A and B can be moved for a given speed change. The levers A and B cooperate with the shift lever C in a sense that lever C must be in a given position with respect to levers A and B to effect a given speed setting. In order to fix the locations to which lever C is to be positioned for any given speed setting, the panel I is provided with a plurality of lenses preferably concentrically located about center F. These lenses are designated 7, 8 and 9 respectively.

In order that the lenses or windows 1 to 9 inclusive may be adequately illuminated in groups of three, a speed indicating and lever position illuminating device 11 is provided. The device 11 is mounted behind the panel I and is provided with a knob 12 mounted on a spindle 13 that projects through an aperture 13' in the panel, and is accessible from the front thereof.

Device 11 comprises a cylinder 14 and a shutter cylinder 15 disposed within the cylinder 14. Cylinder 14 is provided with lugs or ears 16, 17 and 18 which abut the inside face of panel I and are secured thereto by means of screws 19.

The spindle 13 is a part of inner cylinder 15 and provides the driving connection between the knob 12 and the cylinder. Cylinder 15 is provided with an annular dial 21 upon which appear the various spindle speed values that may be accomplished by means of the speed change levers A, B and C. In order to make these speed settings visible to the operator, panel I is provided with an aperture 22 in which a viewer 23 is mounted. The viewer exposes the R. P. M. values on the scale 21 as shown in Fig. 1.

Figure 2:
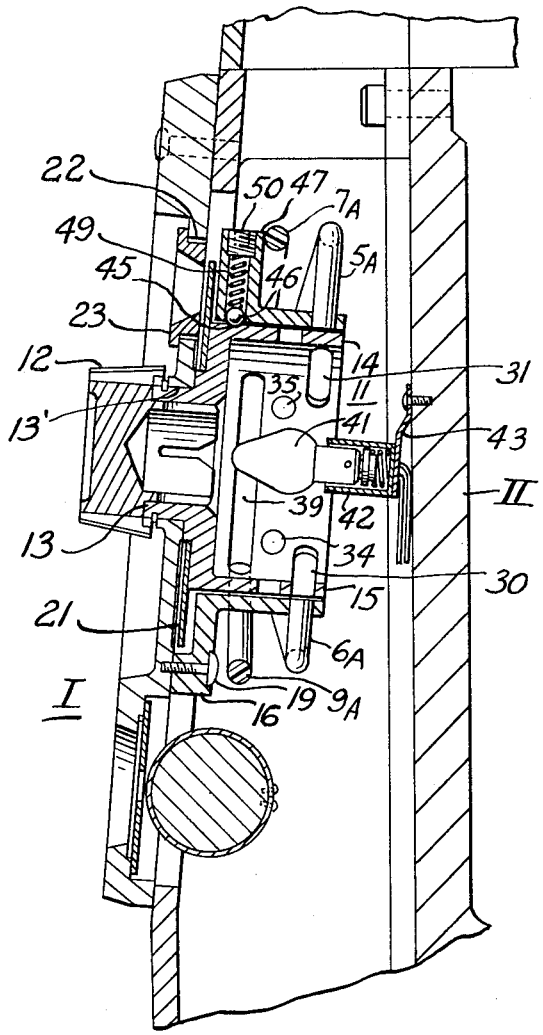
Fig. 2 is a partial view in section taken on line II—II of Fig. 1.

The outer cylinder 14 is provided with a plurality of apertures, preferably circular in form, that are numbered 1' through 9' respectively, so as to correspond with the numbering of lenses 1 through 9 both inclusive of Fig. 1. The inner cylinder 15 is provided with a plurality of slotted and circular windows, see Fig. 3. Figure 3 is a development of the outer and inner cylinders 14 and 15. The edge 26 of cylinder 14 represents the rear end thereof as seen in Fig. 1 and the edge 27 represents the rear end of cylinder 15, as seen in Fig. 2. As shown in Fig. 3, apertures 5' and 6' are relatively close to the edge 26 and are equally spaced, being 180° apart. Apertures 1', 2', 3' and 4' are located approximately on the center of the cylinder 14, that is, they are substantially equidistant from the front and back of the cylinder, and these apertures are grouped relatively close together, that is, apertures 1' and 2' are relatively close together, and the apertures 3' and 4' are relatively close together, although spacings between the two groups are considerably greater. Along the front edge of the cylinder 14 are the apertures 7', 8' and 9' and these are approximately equally spaced.

In the inner cylinder 15, adjacent its rear end, or edge 27, are three relatively long slots 30, 31 and 32. At the center or midway between the front and rear ends of the cylinder 15 are a plurality of circular apertures 33 through 38 inclusive, which are preferably, equally spaced about the periphery of the cylinder 15. At the forward end of the cylinder 15 is a relatively long slot 39 that extends from about a line passing through the middle of slot 30 to about the middle of slot 31. As the cylinder 15 is turned from one position to another within the cylinder 14, there will be a combination of three of the apertures 1' to 9' inclusive that will be in registry with one or another of the apertures 33 to 38 inclusive and the slots 30, 31, 32 and 39 of the cylinder 15.

The manner in which the apertures in the cylinder 14 are placed in register with openings in the cylinder 15 is indicated by the table or chart of Fig. 5 and will be described infra.

The apertures 1' to 9' of the outer cylinder 14 are connected to the lens windows 1 to 9 by means of light piping elements 1A to 9A respectively. These elements may be in the form of rods composed of a light piping material such as "Lucite" or equivalent. In order that the various combination of lenses may be illuminated, a light source in the form of a light bulb 41 is provided and mounted within the cylinder 15. The light bulb 41 is carried in a socket 42 to which electricity may be connected. The socket is secured to a bracket 43 which in turn is secured to the frame II of the lathe. Whenever the shutter cylinder 15 uncovers any group of three of the apertures 1' to 9' a corresponding group of three of the lenses 1 to 9 inclusive are illuminated.

The number of apertures in the outer cylinder 14 and the arrangement of the apertures and slots in cylinder 15 will depend upon the number of speed changes desired.

In the particular panel arrangement and speed indicating mechanism shown in Fig. 1, there are contemplated a total of 24 speed changes, 14 R. P. M., being the slowest speed and 1160 R. P. M., the highest. The intermediate values are indicated by the chart in Fig. 5. Since there are provided in this specific case 24 speed changes, the dial 21 will be marked off into twenty-four equal divisions, each division representing a spindle speed. The 1160 R. P. M. speed is indicated through the window of the viewer in Fig. 1. To the left of the 1160 R. P. M. value is the minimum R. P. M. value of 14. The various speed changes available between 14 R. P. M. and 1160 R. P. M. are marked on the scale in a counterclockwise direction as seen in Fig. 1. Therefore, by turning the knob 12 in a clockwise direction, the various speed settings will increase from one setting to the next higher or higher value selected.

Figure 4 is a schematic illustration of the grouping of the dial 21 and the lenses 1 to 6 and 7 to 9 inclusive. The lenses 1 to 6 are on the left side of the dial 21 and the lenses 7, 8 and 9 are on the right side. As stated supra, Figure 5 illustrates the grouping and spacing of the apertures in the outer cylinder 14 and the inner cylinder 15 for obtaining lumination of two lenses on the left side of the dial and one lens on the right side for any given speed setting.

Chart of Fig. 5 shows that if the knob 12 is turned to a position where the speed setting of 14 R. P. M. is visible through the window above the knob, lenses 1, 5 and 7 will be illuminated. The lumination of these lenses shows the operator where to position levers A, B and C. As the selected R. P. M.'s increase from 14 through 17, 21 and 25 R. P. M., it will be observed that lenses 5 and 7 remain illuminated at each position, but than lenses 2, 3 and 4 will be illuminated in sequence for the R. P. M.'s 17, 21 and 25 respectively. In the speed settings from 30 R. P. M. through 54 R. P. M., the 37 and 45 R. P. M. settings intervenings, lenses 6 and 7 will be illuminated for each of the four speed settings; however lens 1 will be illuminated for the 30 R. P. M. setting, lens 2 for the 37, lens 3 for the 45, and lens 4 for the 54 R. P. M. position. The same explanation is applicable to the remaining R. P. M. settings i. e. 65 through 1160. The X's in the various blocks occurring on the same line as the particular R. P. M. selected, indicate which of the lenses are illuminated.

By means of the speed change indicator illustrated and described, it will be observed that only a single light source is required. This simplifies the electrical wiring circuits for the device as only one circuit is required, namely that for the light bulb 41.

In order that the shutter cylinder 15 may come to rest at any particular speed setting, the periphery of the inner cylinder 14 is provided with a plurality of detents 45 which are spaced in accordance with the spacings of the R. P. M. values on the dial 21. A spring pressed ball 46 carried in a socket 47 on the outer cylinder 14 is yieldingly urged by means of a spring 49 into the detents as they pass under the ball. The outer end of the socket 47 is closed by means of a plug 50.

Having thus described the invention, it will be apparent to those of ordinary skill in the art to which the invention pertains that various modifications and changes may be made in the illustrated embodiment without departing from either the spirit or the scope of the invention.

Therefore, what is claimed as new and desired to be secured by Letters Patent is:

1. A speed change selector and position indicator for the levers provided for shifting the speed change gears of a lathe spindle drive comprising a plurality of lenses adapted to be disposed adjacent the path of travel of the levers and located in the various speed change positions of the levers, a pair of relatively rotatable cylinders disposed one within the other, the outer cylinder being provided with spaced apertures corresponding in number to the number of lenses, light piping members connecting corresponding apertures to corresponding lenses, the other cylinder being provided with apertures arranged to register simultaneously with predetermined apertures in the outer cylinder and a light source within the inner cylinder whereby light is piped through the piping members which are exposed to the light source through said registering apertures, the registering apertures corresponding to the speed change positions of the levers to obtain the desired spindle speed.

2. A selector and indicator as in claim 1 in which one of the relatively rotatable cylinders is provided with a dial on which the various obtainable spindle speeds are indicated and a reference mark for said dial speed values, the apertures which register at any setting of the dial being those which illuminate the lever position indicating lenses required for a particular and selected speed setting.

3. A speed selector and speed change lever position indicator as in claim 1, in which the lenses are arranged in two groups, one group being associated with a plurality of speed change levers and the other lenses with at least a single speed change lever, the number of lenses illuminated for any speed indication selected on the dial corresponding to the number of levers and the respective positions in which the levers are to be set to obtain the selected spindle speed.

4. In combination with a lathe having a plurality of levers for shifting the lathe spindle drive gears according to the spindle speed desired, a pair of said levers operating about a common axis, and another of said levers being spaced from said axis and rotatable about its own axis, of means for indicating the position to which said shift levers are to be placed for a selected spindle speed, said means comprising illuminated lenses located at the various gear selector positions for each lever, relatively rotatable members having a plurality of combinations of registerable apertures, a light source within said relatively rotatable members, light piping members connecting the apertures of one of said relatively rotatable members to the respective illuminatable lenses, the other of said relatively rotatable members having a dial thereon graduated in terms of available spindle speed combinations obtainable by said levers, so that when the member having the dial thereon is positioned to a given speed selection lenses are illuminated at the positions to which said levers should be placed for that selected spindle speed.

5. In combination with a lathe having a plurality of levers for shifting the lathe spindle drive gears according to the spindle speed desired, a pair of said levers operating about a common axis and another of said levers being spaced from said axis and rotatable about its own axis, of means for indicating the position to which said shift levers are to be placed for a selected spindle speed, said means comprising a plurality of lenses adapted to be disposed adjacent the path of travel of the levers and located in the various speed change positions of the levers, a pair of relatively rotatable cylinders disposed one within the other, the outer cylinder being provided with spaced apertures corresponding in number to the number of lenses, light piping members connecting corresponding apertures to corresponding lenses, the other cylinder being provided with apertures arranged to register simultaneously with predetermined apertures in the outer cylinder and a light source within the inner cylinder whereby light is piped through the piping members which are exposed to the light source said registering apertures, the registering apertures corresponding to the speed change positions to which the levers are to be placed in order to obtain the desired spindle speed.

References Cited in the file of this patent

UNITED STATES PATENTS

| | | |
|---|---|---|
| 2,035,998 | Thompson | Mar. 31, 1936 |
| 2,333,492 | Ridge | Nov. 2, 1943 |
| 2,507,909 | Kaysen | May 16, 1950 |